US012141887B2

(12) United States Patent
Jang et al.

(10) Patent No.: US 12,141,887 B2
(45) Date of Patent: Nov. 12, 2024

(54) IMAGE SYNTHESIS DEVICE AND METHOD FOR EMBEDDING WATERMARK

(71) Applicants: NAVER CORPORATION, Seongnam-si (KR); NAVER WEBTOON LTD., Seongnam-si (KR)

(72) Inventors: Han Ul Jang, Seongnam-si (KR); Dong Kyu Kim, Seongnam-si (KR); Dong Yoon Han, Seongnam-si (KR); Sang Doo Yun, Seongnam-si (KR); Choong Hyun Seo, Seongnam-si (KR); In Woo Ro, Seongnam-si (KR)

(73) Assignees: NAVER CORPORATION, Seongnam-si (KR); NAVER WEBTOON LTD., Seongnam-si (KR)

( * ) Notice: Subject to any disclaimer, the term of this patent is extended or adjusted under 35 U.S.C. 154(b) by 467 days.

(21) Appl. No.: 17/649,442

(22) Filed: Jan. 31, 2022

(65) Prior Publication Data
US 2022/0156873 A1    May 19, 2022

Related U.S. Application Data

(63) Continuation of application No. PCT/KR2020/009991, filed on Jul. 29, 2020.

(30) Foreign Application Priority Data

Aug. 1, 2019   (KR) .......................... 10-2019-0094025

(51) Int. Cl.
G06T 1/00       (2006.01)
G06T 3/40       (2006.01)
(Continued)

(52) U.S. Cl.
CPC ................ G06T 1/005 (2013.01); G06T 3/40 (2013.01); G06T 11/00 (2013.01); G06V 10/774 (2022.01);
(Continued)

(58) Field of Classification Search
CPC ......... G06T 1/005; G06T 1/0028; G06T 3/40; G06T 11/00; G06T 2201/0064;
(Continued)

(56) References Cited

U.S. PATENT DOCUMENTS

| 2004/0258243 A1* | 12/2004 | Shin | ....................... H04N 19/61 |
| | | | 386/E5.001 |
| 2010/0215342 A1* | 8/2010 | Lee | ......................... H04N 5/913 |
| | | | 386/E5.003 |
| 2018/0270388 A1* | 9/2018 | Gharaibeh | ......... H04N 1/32203 |

FOREIGN PATENT DOCUMENTS

KR       1020100095244 A       8/2010
KR       20110101577 A    *    9/2011

OTHER PUBLICATIONS

Ming, Yurui, Weiping Ding, Zehong Cao, and Chin-Teng Lin. "A general approach for using deep neural network for digital watermarking." arXiv preprint arXiv:2003.12428 (2020). (Year: 2020).*

(Continued)

*Primary Examiner* — Carol Wang
(74) *Attorney, Agent, or Firm* — Greer Burns & Crain Ltd.

(57) ABSTRACT

An image synthesis method includes inputting an original image and a watermark image into a synthesis model and obtaining a synthesized image output from the synthesis model. The original image and the watermark image are respectively processed in first and second sub-models of the synthesis model and then combined, and the concatenated result is processed in a third sub-model to generate the synthesized image.

12 Claims, 9 Drawing Sheets

(51) Int. Cl.
*G06T 11/00* (2006.01)
*G06V 10/774* (2022.01)
*G06V 10/776* (2022.01)

(52) U.S. Cl.
CPC .... *G06V 10/776* (2022.01); *G06T 2201/0064* (2013.01); *G06T 2201/0065* (2013.01)

(58) Field of Classification Search
CPC .... G06T 2201/0065; G06T 2201/0083; G06V 10/774; G06V 10/776; H04N 5/265; H04N 21/23892; H04N 21/8358
See application file for complete search history.

(56) References Cited

OTHER PUBLICATIONS

Li, Zheng, Chengyu Hu, Yang Zhang, and Shanqing Guo. "How to prove your model belongs to you: A blind-watermark based framework to protect intellectual property of DNN." In Proceedings of the 35th Annual Computer Security Applications Conference, pp. 126-137. 2019. (Year: 2019).*

Yang, Qing, Yiming Zhang, Long Wang, and Wenbo Zhao. "Watermark Image Reconstruction Based on Deep Learning." In 2019 International Conference on Sensing, Diagnostics, Prognostics, and Control (SDPC), pp. 739-743. IEEE, 2019. (Year: 2019).*

Xintao Duan et al.; "Reversible Image Steganography Scheme Based on a U-Net Structure"; IEEE Access, vol. 7, pp. 9314-9323, Jan. 29, 2019.

Farah Deeba et al.; "Protecting intellectual properties of digital watermark using deep neural network"; 2019 4th ICISE, May 4, 2019.

Jiren Zhu et al.; "HiDDeN: Hiding data with deep networks"; arXiv:1807.09937v1, [cs.CV], Jul. 26, 2018.

Bita Darvish Rouhani et al.; "DeepSigns: A generic watermarking framework for protecting the ownership of deep learning models", arXiv: 1804.00750v2 [cs.CR], May 31, 2018.

Huili Chen el al.; "BlackMarks: Blackbox multibit watermarking for deep neural networks"; arXiv:1904.00344v1 [cs.MM], Mar. 31, 2019.

ISR issued in Int'l. Application No. PCT/KR2020/009991, mailed Dec. 3, 2020.

* cited by examiner

IMAGE SYNTHESIS DEVICE AND METHOD FOR EMBEDDING WATERMARK

CROSS-REFERENCE TO RELATED APPLICATIONS

This is a continuation application of International Application No. PCT/KR2020/009991, filed Jul. 29, 2020, which claims the benefit of Korean Patent Application No. 10-2019-0094025, filed Aug. 1, 2019.

BACKGROUND OF THE INVENTION

Field of Invention

The present disclosure relates to the image processing field. More particularly, the present disclosure relates to an image synthesis apparatus and method for embedding a watermark for identifying the source of an image, a copyright owner, etc.

Description of Related Art

As the importance of a work of digital art emerges, various techniques for preventing the illegal distribution/copying of a work are proposed.

As people who consume cartoon content online, such as webtoons, increase, instances in which cartoon content is illegally distributed are also on the increase. For example, a user who has cartoon content by paying a specific sum of money may store, in his or her terminal, cartoon content displayed in the terminal by using a method such as capture, and may share the cartoon content with other users through the Internet.

In order to prevent such an illegal distribution of cartoon content, a technique for embedding a watermark in the cartoon content is proposed, but the technique has a problem in that it is difficult to chase a user who has illegally distributed the cartoon content or the copyright owner of the cartoon content because the watermark is also modified if the user modifies the cartoon content. Furthermore, there is a problem in that the readability of the cartoon content may be degraded because the watermark is embedded in the cartoon content.

Accordingly, there is a need for a scheme capable of easily extracting a watermark even with respect to various modified attacks of users, while reducing the visibility of the watermark inserted into various images including cartoon content.

BRIEF SUMMARY OF THE INVENTION

An image synthesis apparatus and method according to an embodiment has an object of reducing the visibility of a watermark in a synthesized image in which an original image and a watermark image are synthesized.

Furthermore, an image synthesis apparatus and method according to an embodiment has an object of detecting a watermark in a synthesized image although there are various modified attacks of users on the synthesized image.

Furthermore, an image synthesis apparatus and method according to an embodiment has an object of promoting the creative will of creators by preventing illegal distribution of a work.

An image synthesis method according to an embodiment of the present disclosure includes inputting an original image and a watermark image to a synthesis model, and obtaining a synthesized image outputted by the synthesis model. The original image and the watermark image may be processed by a first sub-model and a second sub-model of the synthesis model, respectively, and may be concatenated, and the concatenated result may be processed in a third sub-model to generate the synthesized image.

The image synthesis apparatus and method according to an embodiment can reduce the visibility of a watermark in a synthesized image in which an original image and a watermark image are synthesized.

Furthermore, the image synthesis apparatus and method according to an embodiment can detect a watermark in a synthesized image although there are various modified attacks of users on the synthesized image.

Furthermore, the image synthesis apparatus and method according to an embodiment can promote creative wills of creators by preventing the illegal distribution of a work.

However, the image synthesis apparatus and method according to an embodiment are not limited to the aforementioned effects, and other effects not described may be evidently understood by a person having ordinary skill in the art to which the present disclosure pertains from the following description.

BRIEF DESCRIPTION OF THE DRAWINGS

A brief description of each of the drawings cited in this specification is provided for more sufficient understanding of the drawings.

DETAILED DESCRIPTION OF THE INVENTION

Figure 1:
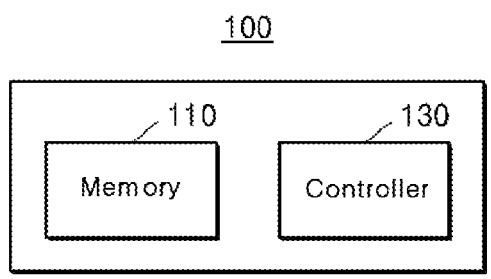
FIG. 1 is a block diagram illustrating a configuration of an image synthesis apparatus according to an embodiment.

An image synthesis method according to an embodiment of the present disclosure includes inputting an original image and a watermark image to a synthesis model, and obtaining a synthesized image outputted by the synthesis model. The original image and the watermark image may be processed by a first sub-model and a second sub-model of the synthesis model, respectively, and may be concatenated, and the concatenated result may be processed in a third sub-model to generate the synthesized image.

An image synthesis apparatus according to another embodiment of the present disclosure includes a processor and a memory storing a synthesis model and at least one program. As the at least one program is executed, the processor may input an original image and a watermark image to a synthesis model, and may obtain a synthesized image outputted by the synthesis model. The original image and the watermark image may be processed by a first sub-model and a second sub-model of the synthesis model, respectively, and may be then concatenated. The concatenated result may be processed in a third sub-model to generate the synthesized image.

The present disclosure may be changed in various ways and may have various embodiments, and specific embodiments are illustrated in the drawings and described in detail in the detailed description. It is however to be understood that the present disclosure is not intended to be limited to a specific embodiment and that the present disclosure includes all changes, equivalents and substitutions which fall within the spirit and technical scope of the present disclosure.

In describing the embodiments, a detailed description of a related known technology will be omitted if it is deemed to make the subject matter of the present disclosure unnecessarily vague. A number (e.g., a first or a second) used in the description process of an embodiment is merely an identification symbol for distinguishing one element from the other element.

Furthermore, in this specification, when it is described that one element is "connected" or "coupled" to the other element, the one element may be directly connected or directly coupled to the other element, but should be understood that the one element may be connected or coupled to the other element through yet another element unless specially described otherwise.

Furthermore, in this specification, two or more elements expressed as "~ part (unit)," "module," etc. may be merged into a single element or one element may be divided into two or more elements for each subdivided function. Furthermore, each of elements to be described hereinafter may additionally perform some of or all the functions of another element in addition to a main function performed by each element. Some of the main function of each element may be fully covered and performed by another element.

Hereinafter, embodiments according to the technical spirit of the present disclosure are described in detail.

Figure 2:
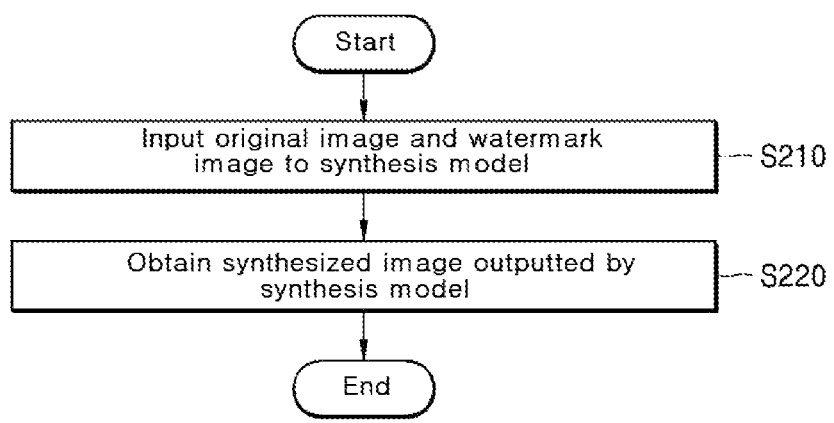
FIG. 2 is a flowchart for describing an image synthesis method according to an embodiment.
Figure 3:
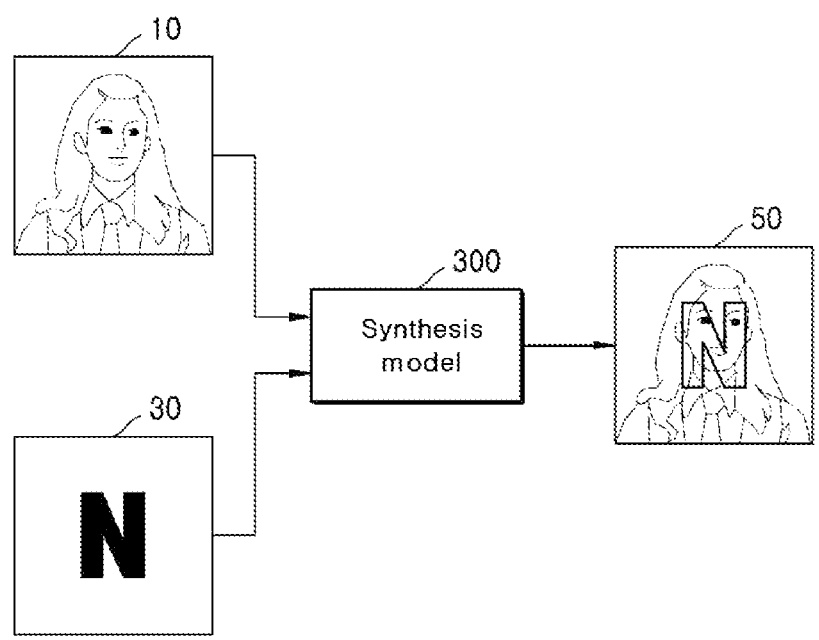
FIG. 3 is a diagram for describing a method of generating a synthesized image through a synthesis model.

FIG. 1 is a block diagram illustrating a configuration of an image synthesis apparatus 100 according to an embodiment. FIGS. 2 and 3 are diagrams for describing an image synthesis method according to an embodiment.

The image synthesis apparatus 100 may include a memory 110 and a controller 130. The memory 110 may be a non-transitory computer readable recording medium, and the controller 130 may be implemented as at least one processor and may operate according to a program stored in the memory 110.

In an embodiment, the image synthesis apparatus 100 may be implemented as a server. The server may synthesize a watermark image with an original image requested by terminal devices, and may transmit the synthesized image to a user terminal.

In another embodiment, the image synthesis apparatus 100 may be implemented as a terminal device. The terminal device may request, from a server, an image selected by a user, and may generate a synthesized image by synthesizing a watermark image with an original image received from the server. In an embodiment, the terminal device may include various types of devices capable of communication with the server over a network, such as a smartphone, a tablet PC, a desktop PC, and a notebook.

In another embodiment, a synthesized image transmitted to the terminal device may be displayed on a display.

The memory 110 may store a synthesis model. The synthesis model may include a deep neural network (DNN) trained to synthesize an original image and a watermark image. In an embodiment, the DNN may include a convolution neural network (CNN). The memory 110 may further store an extraction model 700. The extraction model 700 is described later with reference to FIGS. 6 to 8.

Referring to FIGS. 2 and 3, the controller 130 may input an original image 10 and a watermark image 30 to the synthesis model 300 in step S210, and may process the synthesis model to obtain a synthesized image 50 outputted by the synthesis model 300 in step S220.

The controller 130 may obtain the original image 10 and the watermark image 30 in order to generate the synthesized image 50. The controller 130 may obtain the original image 10 selected by a user. Furthermore, the controller 130 may obtain the watermark image 30 including identification information of the user and/or identification information of a copyright owner. The identification information of the user and/or the identification information of the copyright owner may include various symbols, letters and/or shapes used to specify the user or the copyright owner, such as an ID, a name, a sign, and a logo. The identification information of the user and/or the identification information of the copyright owner may be previously stored in the memory 110.

The image synthesis apparatus 100 according to an embodiment may generate the synthesized image 50 through the synthesis model 300 composed of a DNN. The synthesis model 300 may be trained so that the visibility of a watermark is reduced within the synthesized image 50 and a watermark can be extracted from the synthesized image 50 modified due to various modified attacks.

Hereinafter, a structure of the synthesis model 300 is described with reference to FIGS. 4 and 5.

Figure 4:
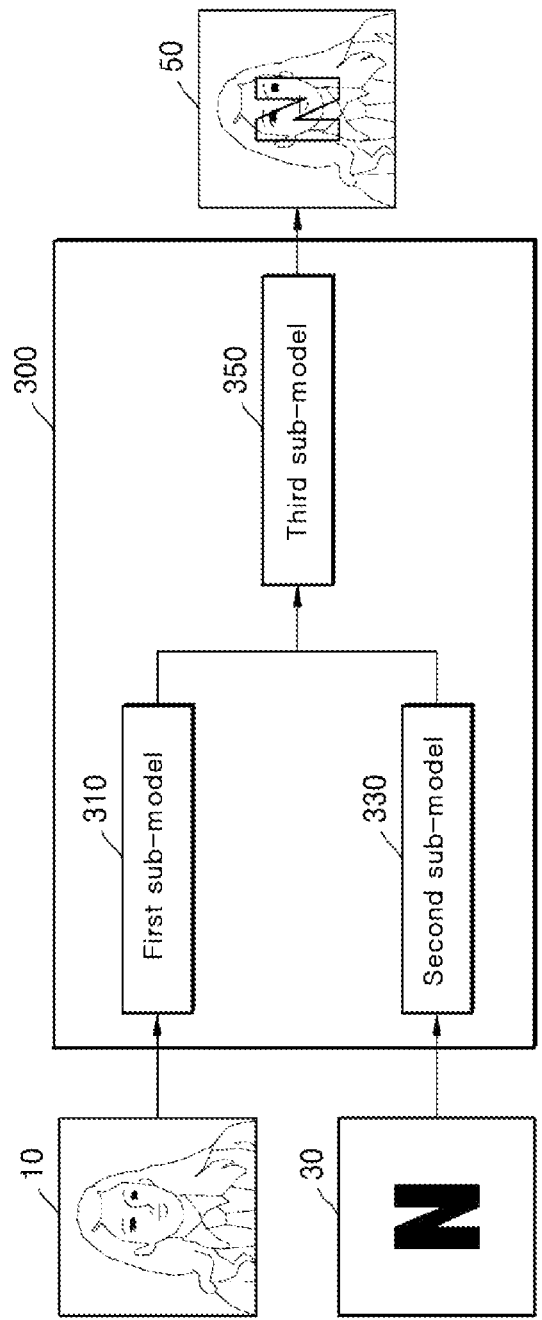
FIG. 4 is a diagram for describing a structure of the synthesis model according to an embodiment.

FIG. 4 is a diagram for describing a structure of the synthesis model 300 according to an embodiment.

The original image 10 and the watermark image 30 may be inputted to the synthesis model 300. The synthesis model 300 synthesizes the original image 10 and the watermark image 30 and outputs the synthesized image 50. The synthesis model 300 may include a first sub-model 310, a second sub-model 330 and a third sub-model 350.

The first sub-model 310 may receive the original image 10 and generate output data. The second sub-model 330 may receive the watermark image 30 and generate output data. The first sub-model 310 may reduce the size of the original image 10. The second sub-model 330 may reduce the size (the width and/or height, or data) of the watermark image 30.

The output data of the first sub-model 310 and the output data of the second sub-model 330 may be concatenated and inputted to the third sub-model 350. The concatenated result of the output data of the first sub-model 310 and the output data of the second sub-model 330 may be processed in the third sub-model 350, so the synthesized image 50 may be generated. The third sub-model 350 may increase the size of the concatenated result of the output data of the first sub-model 310 and the output data of the second sub-model 330.

Each of the first sub-model 310, the second sub-model 330 and the third sub-model 350 may include at least one layer for processing inputted data. The at least one layer may include a convolution layer. The convolution layer may perform convolution processing on the inputted data through a filter kernel, and may output the convolution-processed result to a next layer.

In an embodiment, data outputted by the convolution layer may be continuously processed in a batch normalization layer and an activation layer. The activation layer may assign a non-linear characteristic to the output result of a previous layer. The activation layer may use an activation function. The activation function may include a leaky rectified linear unit (ReLU) function, a sigmoid function, a Tanh function, an ReLU function, etc.

Figure 5:
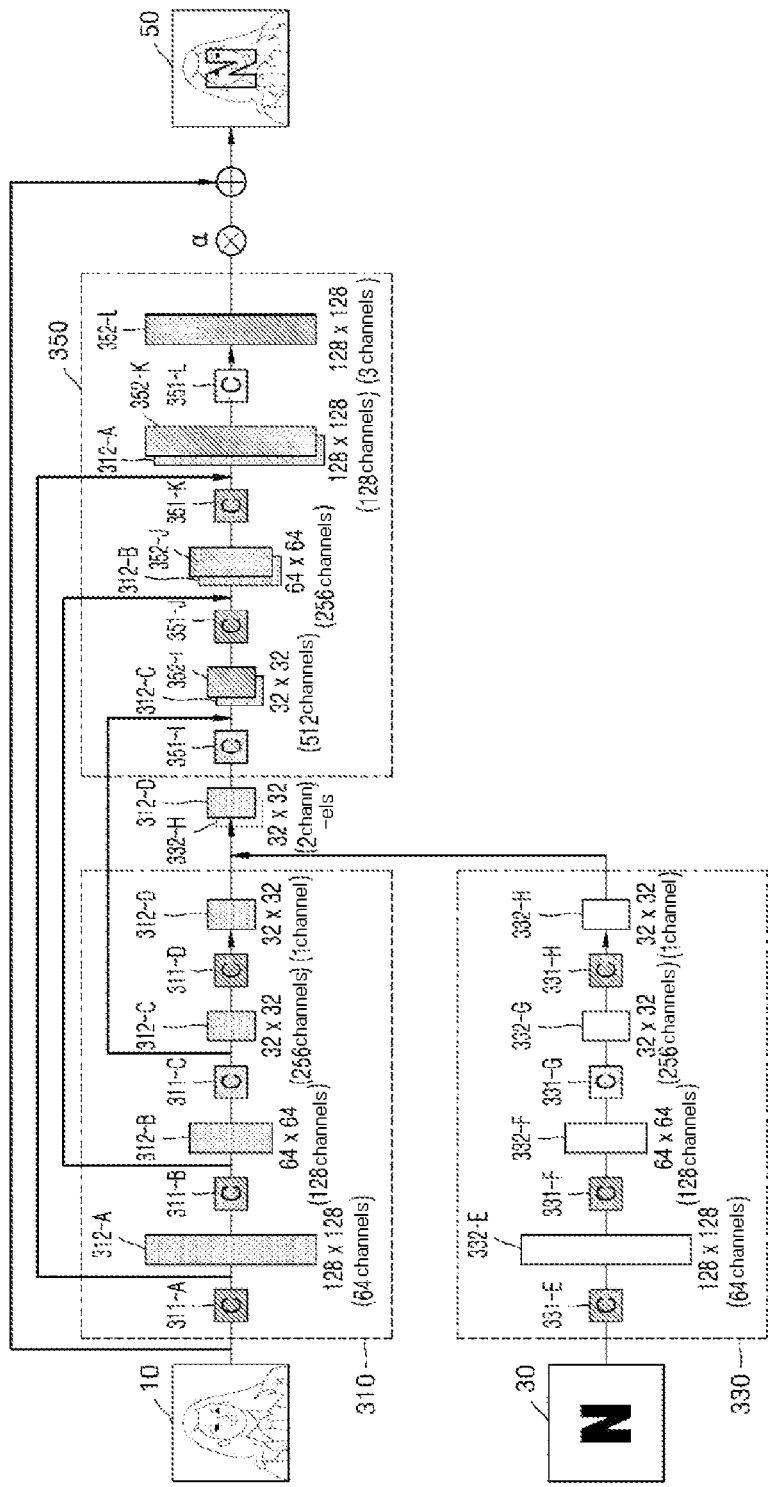
FIG. 5 is a diagram for specifically describing the structure of the synthesis model according to an embodiment.

FIG. 5 is a diagram for specifically describing the structure of the synthesis model 300 according to an embodiment.

Referring to FIG. 5, the first sub-model 310 may include an A convolution layer 311-A, a B convolution layer 311-B, a C convolution layer 311-C and a D convolution layer 311-D. The second sub-model 330 may include an E convolution layer 331-E, an F convolution layer 331-F, a G convolution layer 331-G and an H convolution layer 331-H. The third sub-model 350 may include an I convolution layer 351-I, a J convolution layer 351-J, a K convolution layer 351-K and an L convolution layer 351-L.

Data outputted by the convolution layers included in the first sub-model 310, the second sub-model 330 and the third sub-model 350 may have a given size and a given depth. For example, data 312-A outputted by the A convolution layer 311-A may have a size of 128×128 channels, and a depth thereof may be 64 channels. The A convolution layer 311-A may perform convolution processing on the original image 10 according to a predetermined stride by using a filter kernel having a predetermined size, and may output 64 data 312-A having the size of 128×128.

FIG. 5 illustrates that each of the first sub-model 310, the second sub-model 330 and the third sub-model 350 has four convolution layers, but this is merely an example. The number of convolution layers included in each of the first sub-model 310, the second sub-model 330 and the third sub-model 350 may be variously changed.

Furthermore, the size and depth of output data outputted by the convolution layers included in the first sub-model 310, the second sub-model 330 and the third sub-model 350 are not limited to the illustrated size and depth. Those skilled in the art may variously change the sizes and depths of output data by variously setting the size, number and stride of the filter kernel.

Although not illustrated in FIG. 5, in an embodiment, the batch normalization layer and/or the activation layer may be disposed at the rear stage of at least one of the convolution layers included in each of the first sub-model 310, the second sub-model 330 and the third sub-model 350. For example, if the batch normalization layer and/or the activation layer are disposed at the rear end of the A convolution layer 311-A, data outputted by the A convolution layer 311-A may be processed in the batch normalization layer and/or the activation layer and inputted to the B convolution layer 311-B.

The original image 10 may be inputted to the first sub-model 310, and thus the size thereof may be reduced. The original image 10 may be inputted to the A convolution layer 311-A and subjected to convolution processing. The output data 312-A of the A convolution layer 311-A may be inputted to the B convolution layer 311-B and subjected to convolution processing. Furthermore, output data 312-B of the B convolution layer 311-B may be inputted to the C convolution layer 311-C and subjected to convolution processing. Output data 312-C of the C convolution layer 311-C may be inputted to the D convolution layer 311-D and subjected to convolution processing.

The watermark image 30 may be inputted to the second sub-model 330, and thus the size thereof may be reduced. The watermark image 30 may be inputted to the E convolution layer 331-E and subjected to convolution processing. Output data 332-E of the E convolution layer 331-E may be inputted to the F convolution layer 331-F and subjected to convolution processing. Furthermore, output data 332-F of the F convolution layer 331-F may be inputted to the G convolution layer 331-G and subjected to convolution processing. Output data 332-G of the G convolution layer 331-G may be inputted to the H convolution layer 331-H and subjected to convolution processing.

Output data 312-D of the D convolution layer 311-D and output data 332-H of the H convolution layer 331-H may be concatenated and inputted to the third sub-model 350.

The concatenated result of the output data 312-D of the D convolution layer 311-D and the output data 332-H of the H convolution layer 331-H may be inputted to the third sub-model 350, and thus the size thereof may be increased. The concatenated result may be inputted to the I convolution layer 351-I and subjected to convolution processing. Output data 352-I of the I convolution layer 351-I may be inputted to the J convolution layer 351-J and subjected to convolution processing. Furthermore, output data 352-J of the J convolution layer 351-J may be inputted to the K convolution layer 351-K and subjected to convolution processing. Output data 352-K of the K convolution layer 351-K may be inputted to the L convolution layer 351-L and subjected to convolution processing.

In an embodiment, data outputted by the at least one convolution layer included in the first sub-model 310 may be inputted to a subsequent layer and may be simultaneously concatenated with data outputted by the at least one convolution layer included in the third sub-model 350. The concatenated data may be inputted to a subsequent layer of the third sub-model 350.

The reason why an intermediate output result of the convolution layer included in the first sub-model 310 is concatenated with an intermediate output result of the convolution layer included in the third sub-model 350 is for reducing the visibility of a watermark. In other words, while the concatenated result of the output data 312-D of the D convolution layer 311-D and the output data 332-H of the H convolution layer 331-H is processed in the third sub-model 350, a feature map (i.e., the intermediate output result of the convolution layer included in the first sub-model 310) corresponding to the original image 10 is concatenated. In an example, an intermediate output result of the convolution layer included in the second sub-model 330 is not concatenated with the intermediate output result of the third sub-model 350.

The output data 312-C of the C convolution layer 311-C may be concatenated with the output data 352-I of the I convolution layer 351-I and inputted to the J convolution layer 351-J. The output data 312-B of the B convolution layer 311-B may be concatenated with the output data 352-J of the J convolution layer 351-J and inputted to the K convolution layer 351-K. Furthermore, the output data 312-A of the A convolution layer 311-A may be concatenated with the output data 352-K of the K convolution layer 351-K and inputted to the L convolution layer 351-L.

The output data 312-C of the C convolution layer 311-C and the output data 352-I of the I convolution layer 351-I, which are concatenated with each other, may have the same size; the output data 312-B of the B convolution layer 311-B and the output data 352-J of the J convolution layer 351-J, which are concatenated with each other, may have the same size; and the output data 312-A of the A convolution layer 311-A and the output data 352-K of the K convolution layer 351-K may have the same size. That is, when the intermediate output result of the first sub-model 310 is concatenated with the intermediate output result of the third sub-model 350, the intermediate output results being concatenated have the same size. The reason for this is that if output data having different sizes are concatenated, given convolution processing for the concatenated data may become difficult.

In an embodiment, the sizes of the output data of the convolution layer of the first sub-model 310 and the output data of the convolution layer of the third sub-model 350 which are concatenated with each other may be different from each other. For example, the output data 312-C of the C convolution layer 311-C and the output data 352-I of the I convolution layer 351-I may have different sizes. In an example, for given convolution processing, the J convolution layer 351-J may have a plurality of filter kernels having different sizes. If the size of the output data 312-C of the C convolution layer 311-C is greater than the size of the output data 352-I of the I convolution layer 351-I, the J convolution layer 351-J may perform convolution processing on the output data 312-C of the C convolution layer 311-C by using a first filter kernel having a large size, and may perform convolution processing on the output data 352-I of the I convolution layer 351-I by using a second filter kernel having a small size. Accordingly, data outputted as the results of the convolution using the first filter kernel and data outputted as the results of the convolution using the second filter kernel may have the same size.

In another example, the sizes of filter kernels allocated to the J convolution layer 351-J are the same. If the size of the output data 312-C of the C convolution layer 311-C is greater than the size of the output data 352-I of the I convolution layer 351-I, a first stride for performing convolution processing the output data 312-C of the C convolution layer 311-C may be greater than a second stride for performing convolution processing on the output data 352-I of the I convolution layer 351-I. Accordingly, data outputted as the results of the convolution using the first stride and data outputted as the results of the convolution using the second stride may have the same size.

In an embodiment, the original image 10 may be added to the output data 352-L of the L convolution layer 351-L. As illustrated in FIG. 5, the synthesized image 50 may be generated by multiplying the output data 352-L of the L convolution layer 351-L by a weight a and then adding the multiplied result to the original image 10. The reason why the original image 10 is added to the output data of the third sub-model 350 is for rapidly training the synthesis model 300 by incorporating a difference between an original image 910 for training and a synthesized image 950 for training, which will be described later.

It may be considered that if the original image 10 is assumed to be a prediction value of the synthesized image 50 and output data of the third sub-model 350 is assumed to be a residue value of the synthesized image 50, the synthesized image 50 is generated by adding the prediction value and the residue value together. In this case, when the synthesis model 300 is trained using loss information corresponding to the residue value, a training speed thereof can become very fast.

Figure 6:
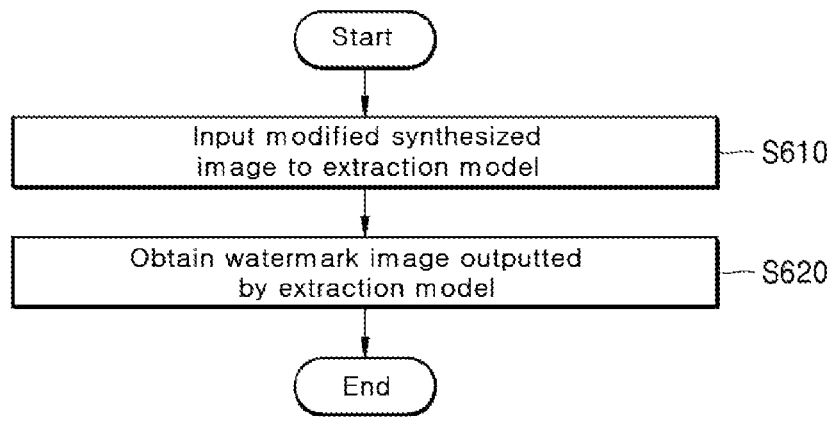
FIG. 6 is a flowchart for describing a method of extracting a watermark image from a synthesized image according to an embodiment.
Figure 7:
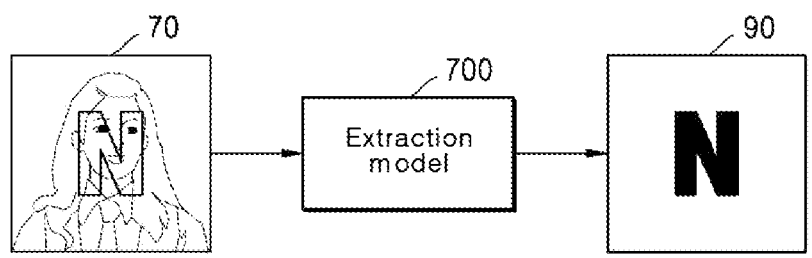
FIG. 7 is a diagram for describing a method of extracting a watermark image from a synthesized image through an extraction model.

FIGS. 6 and 7 are diagrams for describing a method of extracting a watermark image 90 from a synthesized image 70 through an extraction model.

Referring to FIGS. 6 and 7, the controller 130 may input the modified synthesized image 70 to the extraction model 700 in step S610, and may obtain the watermark image 90 outputted by the extraction model 700 in step S620. The controller 130 may obtain the modified synthesized image 70 in order to extract the watermark image 90. In an embodiment, the modified synthesized image 70 may be received from an external device over a network. In another embodiment, the modified synthesized image 70 may be inputted by a manager. (i.e., the administrator of the image synthesis apparatus 100 or the server 1210, or a webtoon service provider).

The modified synthesized image 70 may be an image modified by applying a given type of modification method to the synthesized image 50 generated by the synthesis model 300. The modification method may include at least one of coding through a codec, a noise addition, quantization, rotation, a reduction, enlargement, a change in the pixel position, and filtering, for example. As described above, a user may obtain the synthesized image 50 generated by the image synthesis apparatus 100, and may apply a modification attack to the synthesized image 50 for an illegal distribution.

The image synthesis apparatus 100 according to an embodiment may extract the watermark image 90 by inputting the modified synthesized image 70 to the extraction model 700, and may determine whether the extracted watermark image 90 corresponds to the watermark image 30 used to generate the synthesized image 50. For example, the image synthesis apparatus 100 may previously store the watermark images 30 used to generate the synthesized image 50, and may determine whether the extracted watermark image 90 corresponds to the previously stored watermark image 30 by comparing the watermark image 90, extracted from the modified synthesized image 70, with the previously stored watermark images 30.

In an embodiment, the image synthesis apparatus 100 may identify identification information within the watermark image 90 obtained by inputting the modified synthesized image 70 to the extraction model 700, and may determine whether the identified identification information corresponds to identification information of a user and/or identification information of a copyright owner, which is previously stored.

The image synthesis apparatus 100 may output information indicative of a result of a comparison between the extracted watermark image 90 and the previously stored watermark image 30 or a result of a comparison between identification information identified in the extracted watermark image 90 and identification information of a user and/or identification information of a copyright owner, which is previously stored. The image synthesis apparatus 100 may output the information indicative of the result of the comparison through various output devices, such as a printer, a speaker, and a monitor.

Figure 8:
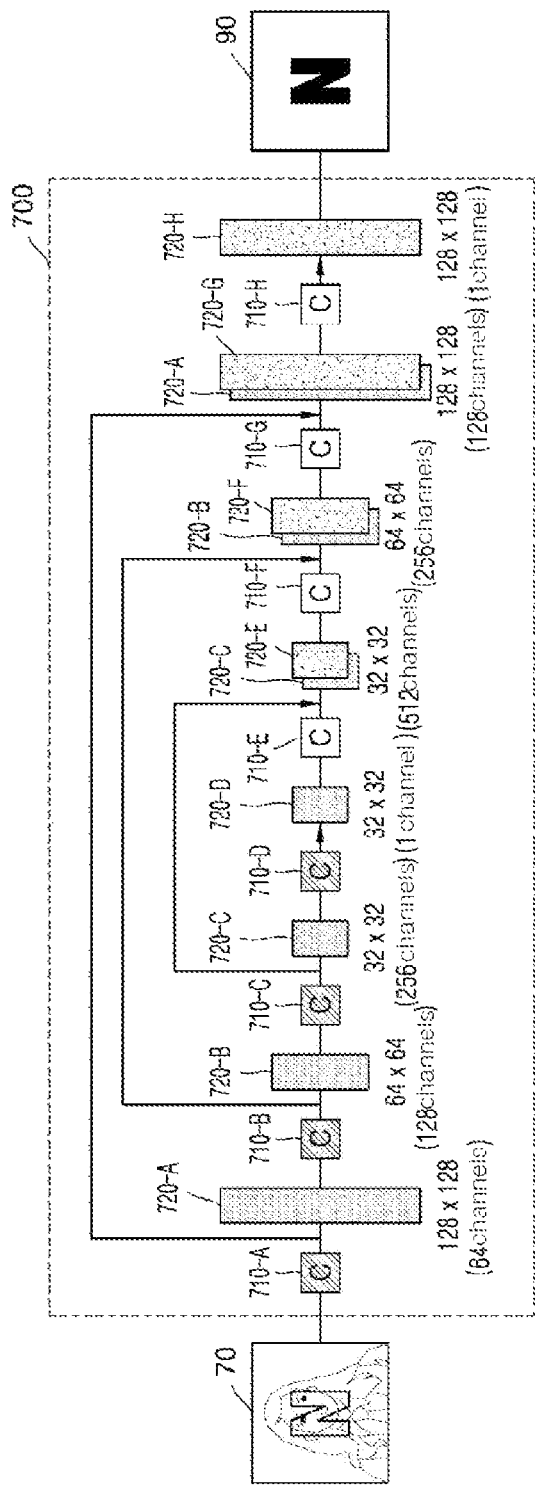
FIG. 8 is a diagram for specifically describing a structure of the extraction model according to an embodiment.

FIG. 8 is a diagram for specifically describing a structure of the extraction model 700 according to an embodiment.

The extraction model 700 may include a plurality of convolution layers. Some of the plurality of convolution layers may reduce the size of inputted data, and the remainder of the plurality of convolution layers may increase the size of inputted data.

Referring to FIG. 8, the extraction model 700 may include an A convolution layer 710-A, a B convolution layer 710-B, a C convolution layer 710-C, a D convolution layer 710-D, an E convolution layer 710-E, an F convolution layer 710-F, a G convolution layer 710-G and an H convolution layer 710-H. The A convolution layer 710-A, the B convolution layer 710-B, the C convolution layer 710-C and the D convolution layer 710-D may correspond to a first sub-model for reducing the size of input data. The E convolution layer 710-E, the F convolution layer 710-F, the G convolution layer 710-G and the H convolution layer 710-H may correspond to a second sub-model for increasing the size of input data.

Data outputted by the convolution layers included in the extraction model 700 may have a given size and a given depth. For example, data 720-A outputted by the A convolution layer 710-A may have a size of 128×128 channels, and a depth thereof may be 64 channels. The A convolution layer 710-A may output 64 data 720-A having the size of 128×128 by performing convolution processing on the modified synthesized image 70 according to a predetermined stride by using a filter kernel having a predetermined size. The sizes and depths of output data outputted by the convolution layers included in the extraction model 700 are not limited to the illustrated sizes and depths. Those skilled in the art may variously change the sizes and depths of output data by variously setting the size, number and stride of the filter kernel.

Furthermore, FIG. 8 illustrates that the extraction model 700 includes the eight convolution layers, but this is merely an example. The number of convolution layers included in the extraction model 700 may be variously changed.

Furthermore, although not illustrated in FIG. 8, a batch normalization layer and/or an activation layer may be disposed at the rear end of at least one of the convolution layers included in the extraction model 700. For example, if the batch normalization layer and/or the activation layer are disposed at the rear end of the A convolution layer 710-A, data outputted by the A convolution layer 710-A may be processed in the batch normalization layer and/or the activation layer and then inputted to the B convolution layer 710-B.

The modified synthesized image 70 may be inputted to the first sub-model, and thus the size thereof may be reduced. The modified synthesized image 70 may be inputted to the A convolution layer 710-A and subjected to convolution processing. The output data 720-A of the A convolution layer 710-A may be inputted to the B convolution layer 710-B and subjected to convolution processing. Furthermore, output data 720-B of the B convolution layer 710-B may be inputted to the C convolution layer 710-C and subjected to convolution processing. Output data 720-C of the C convolution layer 710-C may be inputted to the D convolution layer 710-D and subjected to convolution processing.

Data 720-D outputted by the D convolution layer 710-D may be inputted to the second sub-model, and thus the size thereof may be increased. The data 720-D outputted by the D convolution layer 710-D may be inputted to the E convolution layer 710-E and subjected to convolution processing. Output data 720-E of the E convolution layer 710-E may be inputted to the F convolution layer 710-F and subjected to convolution processing. Furthermore, output data 720-F of the F convolution layer 710-F may be inputted to the G convolution layer 710-G and subjected to convolution processing. Output data 720-G of the G convolution layer 710-G may be inputted to the H convolution layer 710-H and subjected to convolution processing.

In an embodiment, data outputted by the at least one convolution layer included in the first sub-model may be inputted to a subsequent layer, and may be simultaneously concatenated with data outputted by the at least one convolution layer included in the second sub-model. The concatenated data may be inputted to a subsequent layer of the second sub-model.

Referring to FIG. 8, the output data 720-C of the C convolution layer 710-C may be concatenated with the output data 720-E of the E convolution layer 710-E and inputted to the F convolution layer 710-F. The output data 720-B of the B convolution layer 710-B may be concatenated with the output data 720-F of the F convolution layer 710-F and inputted to the G convolution layer 710-G. Furthermore, the output data 720-A of the A convolution layer 710-A may be concatenated with the output data 720-G of the G convolution layer 710-G and inputted to the H convolution layer 710-H.

The output data 720-C of the C convolution layer 710-C and the output data 720-E of the E convolution layer 710-E, which are concatenated with each other, may have the same size; the output data 720-B of the B convolution layer 710-B and the output data 720-F of the F convolution layer 710-F, which are concatenated with each other, may have the same size; and the output data 720-A of the A convolution layer 710-A and the output data 720-G of the G convolution layer 710-G, which are concatenated with each other, may have the same size. That is, when an intermediate output result of the first sub-model is concatenated with an intermediate output result of the second sub-model, the intermediate output results the same size.

In an embodiment, the sizes of output data of the convolution layer of the first sub-model 310 and output data of the convolution layer of the second sub-model 330 which are concatenated with each other may be different from each other. For example, the output data 720-C of the C convolution layer 710-C and the output data 720-E of the E convolution layer 710-E may have different sizes. In an example, for given convolution processing, the F convolution layer 710-F may have a plurality of filter kernels having different sizes. If the size of the output data 720-C of the C convolution layer 710-C is greater than the output data 720-E of the E convolution layer 710-E, the F convolution layer 710-F may perform convolution processing on the output data 720-C of the C convolution layer 710-C by using a first filter kernel having a large size, and may perform convolution processing on the output data 720-F of the E convolution layer 710-F by using a second filter kernel having a small size. Accordingly, data outputted as the results of the convolution using the first filter kernel and data outputted as the results of the convolution using the second filter kernel may have the same size.

In another example, the sizes of the filter kernels assigned to the F convolution layer 710-F are the same. However, if the size of the output data 720-C of the C convolution layer 710-C is greater than the size of the output data 720-E of the E convolution layer 710-E, a first stride for performing convolution processing on the output data 720-C of the C convolution layer 710-C may be greater than a second stride for performing convolution processing on the output data 720-E of the E convolution layer 710-E. Accordingly, data outputted as the results of the convolution using the first stride and data outputted as the results of the convolution using the second stride may have the same size.

Figure 9:
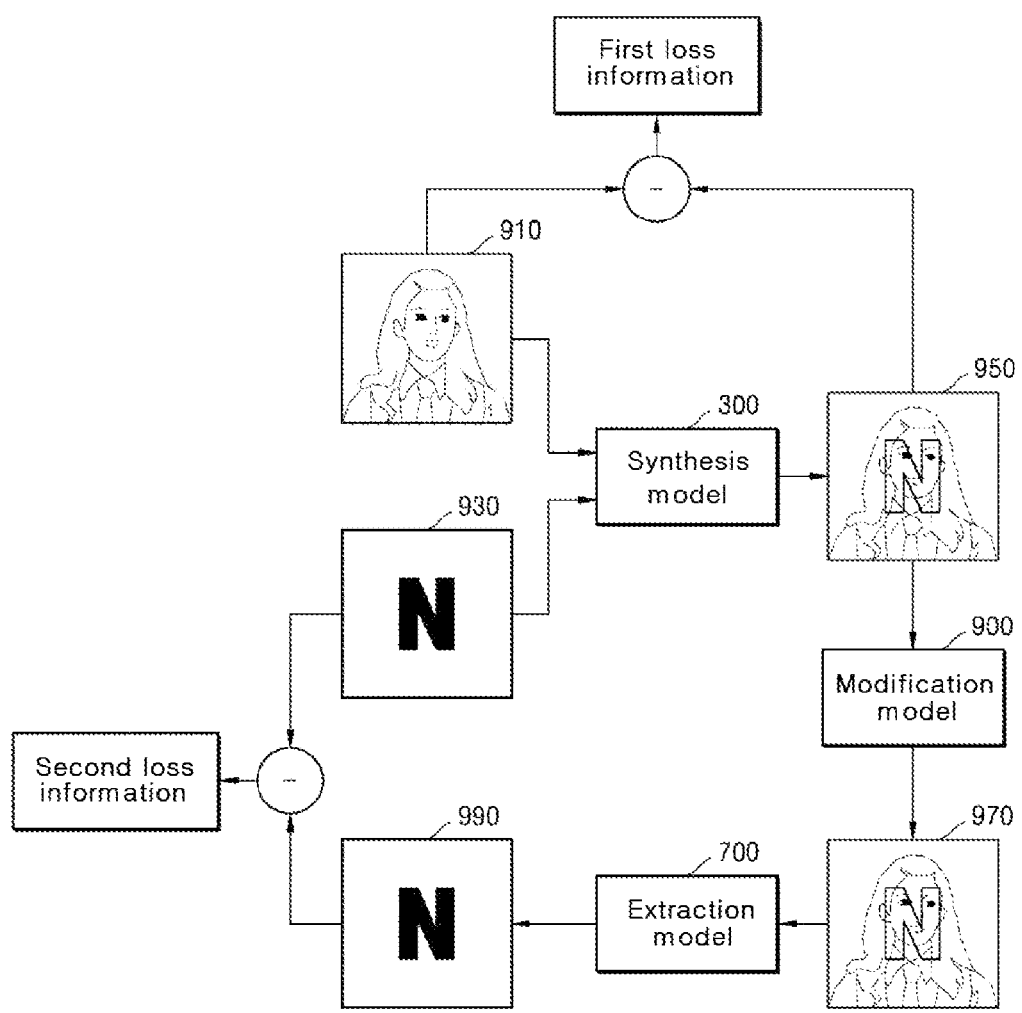
FIG. 9 is a diagram for describing a method of training the synthesis model and the extraction model according to an embodiment.

FIG. 9 is a diagram for describing a method of training the synthesis model 300 and the extraction model 700 according to an embodiment.

Referring to FIG. 9, an original image 910 for training and a watermark image 930 for training may be inputted to the synthesis model 300. The synthesis model 300 may output a synthesized image 950 for training. Furthermore, a modified synthesized image 970 for training may be generated by applying a modification model 900 to the synthesized image 950 for training. The modified synthesized image 970 for training may be inputted to the extraction model 700. The extraction model 700 may output a watermark image 990.

In an embodiment, the synthesis model 300 may be trained so that first loss information calculated based on a difference between the original image 910 for training and the synthesized image 950 for training is reduced. The synthesis model 300 may be trained so that the first loss information calculated based on a difference between the original image 910 for training and the synthesized image 950 for training is minimized. For example, any one of an L1-norm value, an L2-norm value, an SSIM value, a PSNR-HVS value, an MS-SSIM value, a VIF value and a VMAF value or a result of a combination of two or more of these may be used as the first loss information. Furthermore, in an example, the first loss information may correspond to a difference between two feature maps outputted by a DNN after each of the original image 910 for training and the synthesized image 950 for training is inputted to the DNN for extracting feature maps. The DNN may be VGG-16, for example. The feature maps corresponding to the original image 910 for training and the synthesized image 950 for training may include a feature map outputted by ReLU2_2 of VGG-16.

To perform the training so that the first loss information is reduced or minimized may mean that the synthesized image 950 for training, which has a little difference with the original image 910 for training, is generated. That is, since training is performed so that the first loss information is reduced or minimized, the visibility of a watermark within the synthesized image 950 for training can be reduced.

In an embodiment, the extraction model 700 may be trained so that second loss information calculated based on a difference between the watermark image 930 for training and the watermark image 990 outputted by the extraction model 700 is reduced. The extraction model 700 may be trained so that the second loss information is minimized. For example, any one of an L1-norm value, an L2-norm value, an SSIM value, a PSNR-HVS value, an MS-SSIM value, a VIF value and a VMAF value or a result of a combination of two or more of these may be used as the second loss information. Furthermore, in an example, the second loss information may correspond to a difference between two feature maps outputted by a DNN after each of the watermark image 930 for training and the watermark image 990 outputted by the extraction model 700 is inputted to the DNN for extracting feature maps. The DNN may be VGG-16, for example.

To perform the training so that the second loss information is reduced or minimized may mean that although various modified attacks are applied to the synthesized image 950 for training, the watermark image 990 is made to be well extracted from the modified synthesized image 970 for training. That is, since the extraction model 700 is trained so that the second loss information is reduced or minimized, the extraction model 700 can more accurately extract the watermark image 990 from the modified synthesized image 970 for training.

In an embodiment, the synthesis model 300 and the extraction model 700 may be trained so that the final loss information obtained by concatenating the first loss information and the second loss information is reduced. Alternatively, the synthesis model 300 and the extraction model 700 may be trained so that the final loss information obtained by concatenating the first loss information and the second loss information is minimized.

The final loss information may be calculated according to Equation 1 below.

$$L = \lambda_{img\_mse} L_{img\_mse} + \lambda_{vgg} L_{vgg} + \lambda_{wm\_mse} L_{wm\_mse} \quad \text{[Equation 1]}$$

In Equation 1, L indicates the final loss information. $L_{img\_mse}$ indicates loss information calculated based on a difference between the original image 910 for training and the synthesized image 950 for training and indicates any one of an L1-norm value, an L2-norm value, an SSIM value, a PSNR-HVS value, an MS-SSIM value, a VIF value and a VMAF value or a result of a combination of two or more of them. $L_{vgg}$ indicates loss information calculated based on a difference between feature map outputted by ReLU2_2 by inputting the original image 910 for training and the synthesized image 950 for training to VGG-16. $L_{wm\_mse}$ indicates loss information calculated based on a difference between the watermark image 930 for training and the watermark image 990 outputted by the extraction model 700. Furthermore, $\lambda_{img\_mse}$, $\lambda_{vgg}$ and $\lambda_{wm\_mse}$ indicate weights applied to the pieces of loss information, respectively.

In Equation 1, each of $\lambda_{img\_mse}$ and $\lambda_{vgg}$ may be set to be greater than $\lambda_{wm\_mse}$. To set each of $\lambda_{img\_mse}$ and $\lambda_{vgg}$ to be greater than $\lambda_{wm\_mse}$ means that the visibility of a watermark within the synthesized image 950 for training is more importantly incorporated than the extraction robustness of the watermark image 990. In other words, the weights having greater values are applied to $L_{img\_mse}$ and $L_{vgg}$ so that the size of the final loss information is greatly influenced by $L_{img\_mse}$ and $L_{vgg}$ in order to reduce the difference between the original image 910 for training and the synthesized image 950 for training.

In FIG. 9, the modification model 900 is modeled from various types of modification attacks which may be applied to the synthesized image 50. As described above, the modification attacks may include coding through a codec, a noise addition, quantization, rotation, a reduction, enlargement, a change in the pixel position, and filtering. The modification model 900 may be determined in accordance with each of several modification attacks.

The modeling of a forward function and backward function for a differentiable modification attack (e.g., a noise addition, a reduction, enlargement, or a pixel movement) among modification attacks and a forward function for a non-differentiable modification attack (e.g., coding through a codec, quantization, or median filtering) may be determined according to a known modeling method, but the modeling of a backward function for a non-differentiable modification attack is problematic.

Figure 10:
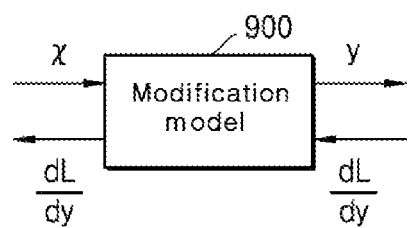
FIG. 10 is a diagram for describing the modification model illustrated in FIG. 9.

Referring to FIG. 10, when x is inputted to the modification model 900 and y is outputted by the modification model 900, a partial differential of a backward function for a non-differentiable modification attack may be approximated as 1. This is based on the assumption that although an attacker attempts to apply a modification attack to an input image, the attacker will generate an output image very similar to the input image.

If the final loss information is L and a differential of L for x is dL/dx, dL/dx is represented as the product of dL/dy, that is, the differential of L for y, and dy/dx, that is, a differential of y for x, according to a differential chain law. dy/dx may be substituted with 1 according to Equation 2 below.

$$\frac{dL}{dx} = \frac{dL}{dy} \cdot \frac{dy}{dx} = \frac{dL}{dy} \cdot 1 = \frac{dL}{dy}$$ [Equation 2]

Figure 11:
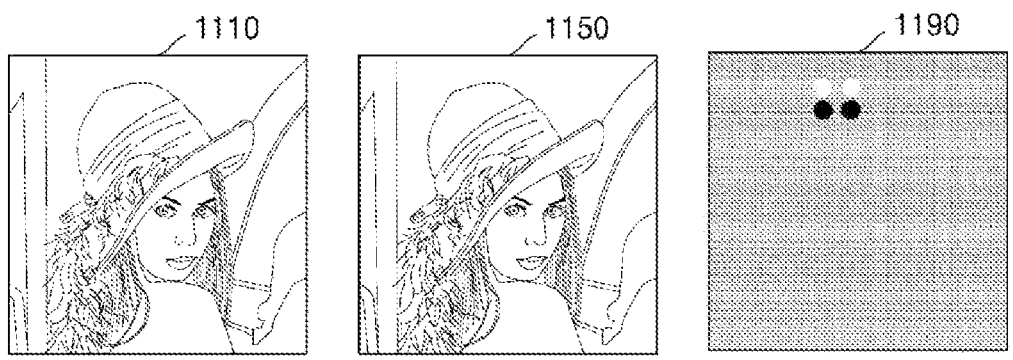
FIG. 11 is a diagram illustrating an original image, a synthesized image generated according to an image synthesis method according to an embodiment and a watermark image generated according to an image extraction method according to an embodiment.

FIG. 11 is a diagram illustrating an original image 1110, a synthesized image 1150 generated according to an image synthesis method according to an embodiment and a watermark image 1190 generated according to an image extraction method according to an embodiment.

Referring to FIG. 11, since the synthesis model 300 has been trained so that a difference between the original image 1110 and the synthesized image 1150 is reduced or minimized, it is difficult to identify a difference between the original image 1110 and the synthesized image 1150 with an eye. That is, it is difficult to discover a watermark in the synthesized image 50. Furthermore, since the extraction model 700 has been trained so that the extraction ability of the watermark image 1190 is increased or maximized, the watermark 1190 can be extracted even from the synthesized image 1150 in which a watermark cannot be identified.

A dot within the watermark image 1190 illustrated in FIG. 11 is an embedded watermark, and indicates a message. The watermark may have a value of 0 or 1. For example, a white dot may have a value of 0, and a black dot may have a value of 1. In other words, the watermark may be embedded so that it has any one of the two values. Each of the dots constituting the watermark may have a two-dimensional Gaussian form. The visibility of a watermark within the synthesized image 1150 can be further reduced according to such a two-dimensional Gaussian form.

Figure 12:
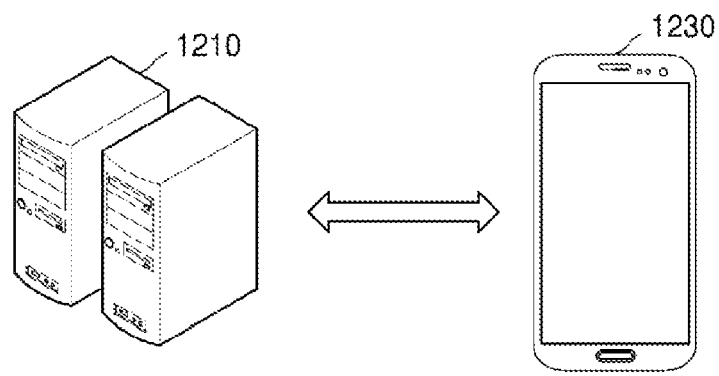
FIG. 12 is a diagram for describing an environment in which the image synthesis apparatus according to an embodiment is applied.

FIG. 12 is a diagram for describing an environment in which the image synthesis apparatus 100 according to an embodiment is applied.

Referring to FIG. 12, a server 1210 and terminal devices 1230 may communicate with each other over a network. The server 1210 may transmit an image to the terminal device 1230 in response to a request from the terminal device 1230. The terminal device 1230 may display, on a display, the image received from the server 1210.

In an example, the server 1210 may provide a webtoon service. The terminal device 1230 may access the server 1210, and may request the transmission of webtoon selected by a user. The server 1210 may transmit, to the terminal device 1230, webtoon content (i.e., an image) selected by the terminal device 1230. In an embodiment, the server 1210 may transmit webtoon content to the terminal device 1230 when a user of the terminal device 1230 pays a given amount of money or uses a given point.

In an embodiment, the image synthesis apparatus 100 may be included in the server 1210. In this case, the server 1210 may generate the synthesized image 50 by inputting, to the synthesis model 300, the original image 10 requested by the terminal device 1230 and the watermark image 30, and may transmit the synthesized image 50 to the terminal device 1230. The watermark image 30 may include an ID assigned to a user of the terminal device 1230. The terminal device 1230 may display, on the display, the synthesized image 50 received from the server 1210. Furthermore, the server 1210 may obtain the watermark image 90 by inputting, to the extraction model 700, the modified synthesized image 70 received from an external device or inputted by a manager. The server 1210 may determine whether the extracted watermark image 90 corresponds to the watermark image 30 used to generate the synthesized image 50, and may output the result of the determination through an output device, such as a monitor, a speaker or a printer.

Furthermore, in an embodiment, the image synthesis apparatus 100 may be included in the terminal device 1230. The terminal device 1230 may request, from the server 1210, the transmission of an image selected by a user, and may receive the original image 10 from the server 1210. The terminal device 1230 may generate the synthesized image 50 by inputting the received original image 10 and the watermark image 30 to the synthesis model 300, and may display the generated synthesized image 50 on the display of the terminal device 1230. Furthermore, the terminal device 1230 may obtain the watermark image 90 by inputting, to the extraction model 700, the modified synthesized image 70 received from an external device or inputted by a user. The terminal device 1230 may determine whether the extracted watermark image 90 corresponds to the watermark image 30 used to generate the synthesized image 50, and may output the result of the determination through an output device, such as a monitor, a speaker or a printer.

The aforementioned method may be provided as a computer program stored in a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

Although preferred embodiments of the technical spirit of the present disclosure have been described in detail above, the technical spirit of the present disclosure is not limited to the embodiments, and may be modified in various ways within the technical spirit of the present disclosure by a person having ordinary knowledge in the art.

The invention claimed is:

1. An image synthesis method performed by a processor, comprising:
   inputting an original image and a watermark image to a synthesis model; and
   obtaining a synthesized image outputted by the synthesis model,
   wherein the original image and the watermark image are processed by a first sub-model and second sub-model of the synthesis model, respectively,
   the processed original image and the watermark image are concatenated into a first concatenated result, and the first concatenated result is processed in a third sub-model of the synthesis model to generate the synthesized image, and
wherein output data of a layer included in the first sub-model is concatenated with output data of a layer included in the third sub-model to generate a second concatenated result, and the second concatenated result is inputted to a next layer of the third sub-model.

2. The image synthesis method of claim 1, wherein a size of the output data of the layer included in the first sub-model and a size of the output data of the layer included in the third sub-model are identical with each other.

3. The image synthesis method of claim 1, wherein the original image is added to output data of the third sub-model to generate the synthesized image.

4. The image synthesis method of claim 1, wherein:
the first sub-model comprises at least one layer for reducing a size of the original image,
the second sub-model comprises at least one layer for reducing a size of the watermark image, and
the third sub-model comprises at least one layer for increasing a size of the first concatenated result.

5. The image synthesis method of claim 1, further comprising:
inputting a modified synthesized image to an extraction model; and
obtaining a watermark image outputted by the extraction model,
wherein the extraction model comprises a first sub-model for reducing a size of the modified synthesized image and a second sub-model for increasing a size of output data of the first sub-model of the extraction model.

6. The image synthesis method of claim 5, wherein output data of a layer included in the first sub-model of the extraction model is concatenated with output data of a layer included in the second sub-model of the extraction model to generate a third concatenated result, and the third concatenated result is inputted to a next layer of the second sub-model of the extraction model.

7. The image synthesis method of claim 5, further comprising:
inputting a training original image for training and a training watermark image for training to the synthesis model; and
inputting a training modified synthesized image for training to the extraction model,
wherein the synthesis model and the extraction model are trained so that final loss information, obtained by concatenating first loss information calculated based on a difference between a synthesized image for training outputted by the synthesis model and the training original image for training and second loss information calculated based on a difference between the training watermark image for training and a watermark image outputted by the extraction model, is reduced.

8. The image synthesis method of claim 7, further comprising generating the training modified synthesized image for training by modifying the synthesized image for training according to a modification model,
wherein the modification model is generated in accordance with each of a plurality of modification methods.

9. The image synthesis method of claim 7, wherein:
the final loss information is calculated by applying a first weight and a second weight to the first loss information and the second loss information, respectively, and then adding the first loss information and the second loss information together, and
the first weight is greater than the second weight.

10. The image synthesis method of claim 1, further comprising obtaining the watermark image corresponding to identification information of a user of a terminal device accessing a server for the original image.

11. A non-transitory computer readable recording medium storing a program executable by a processor for performing the image synthesis method of claim 1.

12. An image synthesis apparatus comprising:
a processor, and
a memory storing a synthesis model and at least one program,
wherein the processor inputs an original image and a watermark image to a synthesis model and executes the program to process the synthesis model and obtain a synthesized image outputted by the synthesis model,
wherein the original image and the watermark image are processed by a first sub-model and second sub-model of the synthesis model, respectively,
the processed original image and the watermark image are concatenated into a concatenated result, and
the concatenated result is processed in a third sub-model of the synthesis model to generate the synthesized image, and
wherein output data of a layer included in the first sub-model is concatenated with output data of a layer included in the third sub-model to generate a second concatenated result, and the second concatenated result is inputted to a next layer of the third sub-model.

* * * * *